United States Patent
Chang et al.

(10) Patent No.: US 9,803,764 B2
(45) Date of Patent: Oct. 31, 2017

(54) FAIL SAFETY COOLANT CONTROL VALVE

(71) Applicant: INZI CONTROLS CO. LTD., Siheung-si, Gyeonggi-do (KR)

(72) Inventors: Seok Yoon Chang, Suwon-si (KR); Jun Woo Kim, Yongin-si (KR); Seo Kyu Kim, Incheon (KR); Jae Young Son, Gunpo-si (KR); Chang Hyun Park, Yongin-si (KR); Dong June Kang, Incheon (KR)

(73) Assignee: INZI CONTROLS CO. LTD., Siheung-Si (KR)

( * ) Notice: Subject to any disclaimer, the term of this patent is extended or adjusted under 35 U.S.C. 154(b) by 326 days.

(21) Appl. No.: 14/412,748

(22) PCT Filed: Oct. 8, 2014

(86) PCT No.: PCT/KR2014/009474
§ 371 (c)(1),
(2) Date: Jan. 5, 2015

(87) PCT Pub. No.: WO2016/017853
PCT Pub. Date: Feb. 4, 2016

(65) Prior Publication Data
US 2016/0273671 A1 Sep. 22, 2016

(30) Foreign Application Priority Data
Jul. 31, 2014 (KR) .................. 10-2014-0097880

(51) Int. Cl.
*G05D 23/02* (2006.01)
*F16K 31/524* (2006.01)
(Continued)

(52) U.S. Cl.
CPC .............. *F16K 17/386* (2013.01); *F01P 7/14* (2013.01); *F16K 11/085* (2013.01);
(Continued)

(58) Field of Classification Search
CPC .. G05D 23/021; G05D 23/022; F16K 31/524; F16K 11/0856; F16C 19/12; F16C 19/32; F16C 19/507; F16C 11/02
(Continued)

(56) References Cited

U.S. PATENT DOCUMENTS 4,112,974 A * 9/1978 Davis ................ F16K 31/001
137/625.29
6,189,798 B1 2/2001 Sano et al.
(Continued)

FOREIGN PATENT DOCUMENTS

| EP | 2 851 593 A1 | 3/2015 |
| FR | 2839164 A1 | 10/2003 |
| GB | 835041 A1 | 5/1960 |

OTHER PUBLICATIONS

Nice, Karim. "How Bearings Work". HowStuffWorks.com. Jul. 4, 2013. Accessed Jan. 6, 2017 via Archive.org: http://web.archive.org/web/20130704183003/http://science.howstuffworks.com/transport/engines-equipment/ bearing3.htm.*
(Continued)

Primary Examiner — Judy Swann
Assistant Examiner — Mark L Greene
(74) Attorney, Agent, or Firm — Sughrue Mion, PLLC

(57) ABSTRACT

Disclosed herein is a fail-safe coolant control valve. The fail-safe coolant control valve includes a valve housing, a valve member, an actuator, and a fail-safe unit. The valve housing is provided on an outer surface thereof with at least two ports. The valve housing has therein an internal space communicating with the ports. The valve member is rotatably installed in the internal space of the valve housing and rotates via an actuator. The fail-safe unit rotates the valve member depending on a temperature of a coolant in the valve housing when a failure occurs.

7 Claims, 14 Drawing Sheets

(51) Int. Cl.
*F16K 11/085* (2006.01)
*F16K 17/38* (2006.01)
*F01P 7/14* (2006.01)
*F16K 31/00* (2006.01)

(52) U.S. Cl.
CPC .......... *F16K 11/0856* (2013.01); *F16K 17/38* (2013.01); *F16K 31/002* (2013.01); *F16K 31/524* (2013.01); *G05D 23/022* (2013.01)

(58) Field of Classification Search
USPC .... 236/93 A, 99 K, 99 J, 99 R; 251/252, 11, 251/251; 384/504, 613
See application file for complete search history.

(56) References Cited

U.S. PATENT DOCUMENTS

| | | | |
|---|---|---|---|
| 2002/0047050 A1 | 4/2002 | Leu et al. | |
| 2012/0279462 A1* | 11/2012 | Warnery | F01P 7/167 123/41.08 |
| 2014/0072255 A1* | 3/2014 | Szuba | F16C 43/083 384/619 |

OTHER PUBLICATIONS

European Patent Office; Communication dated Oct. 4, 2016 in counterpart European application No. 14814678.0.

* cited by examiner

[Fig. 1]
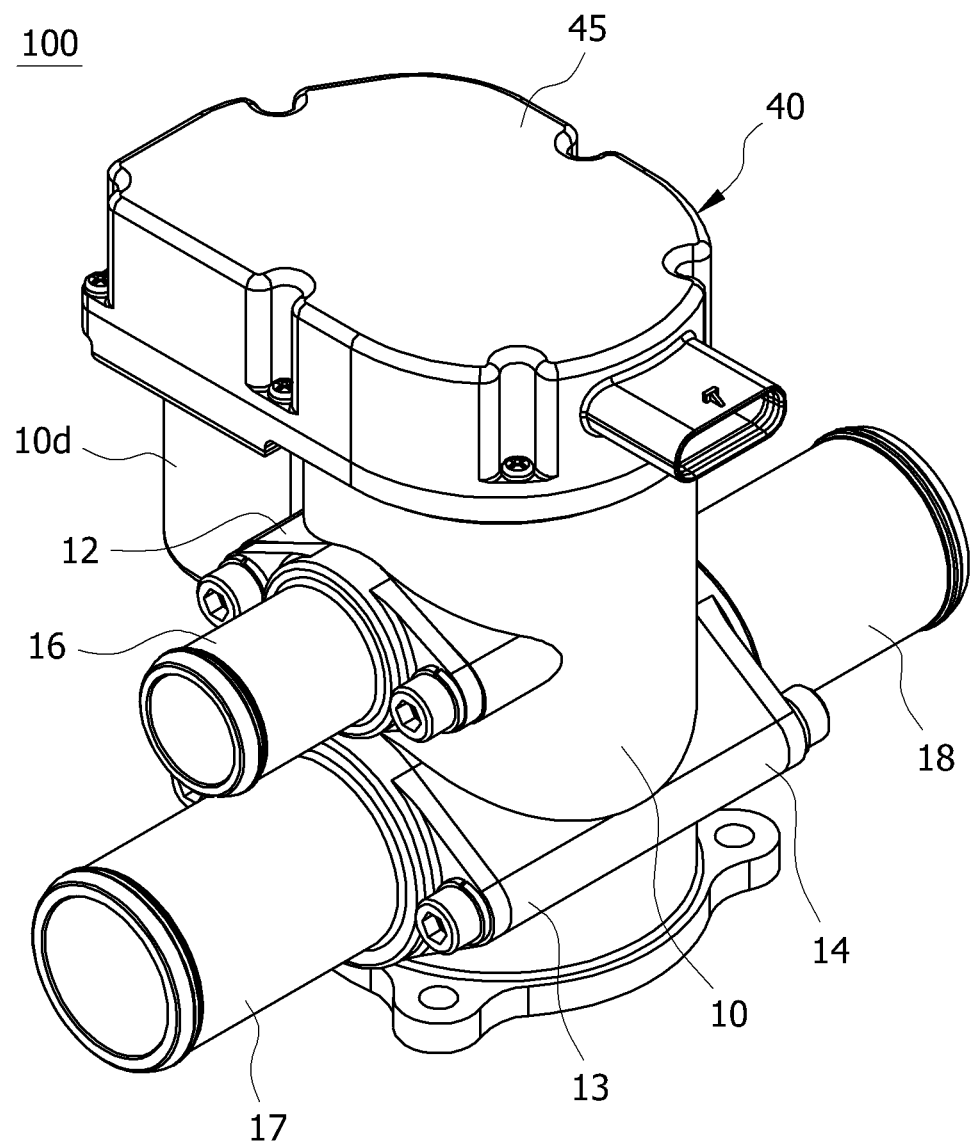

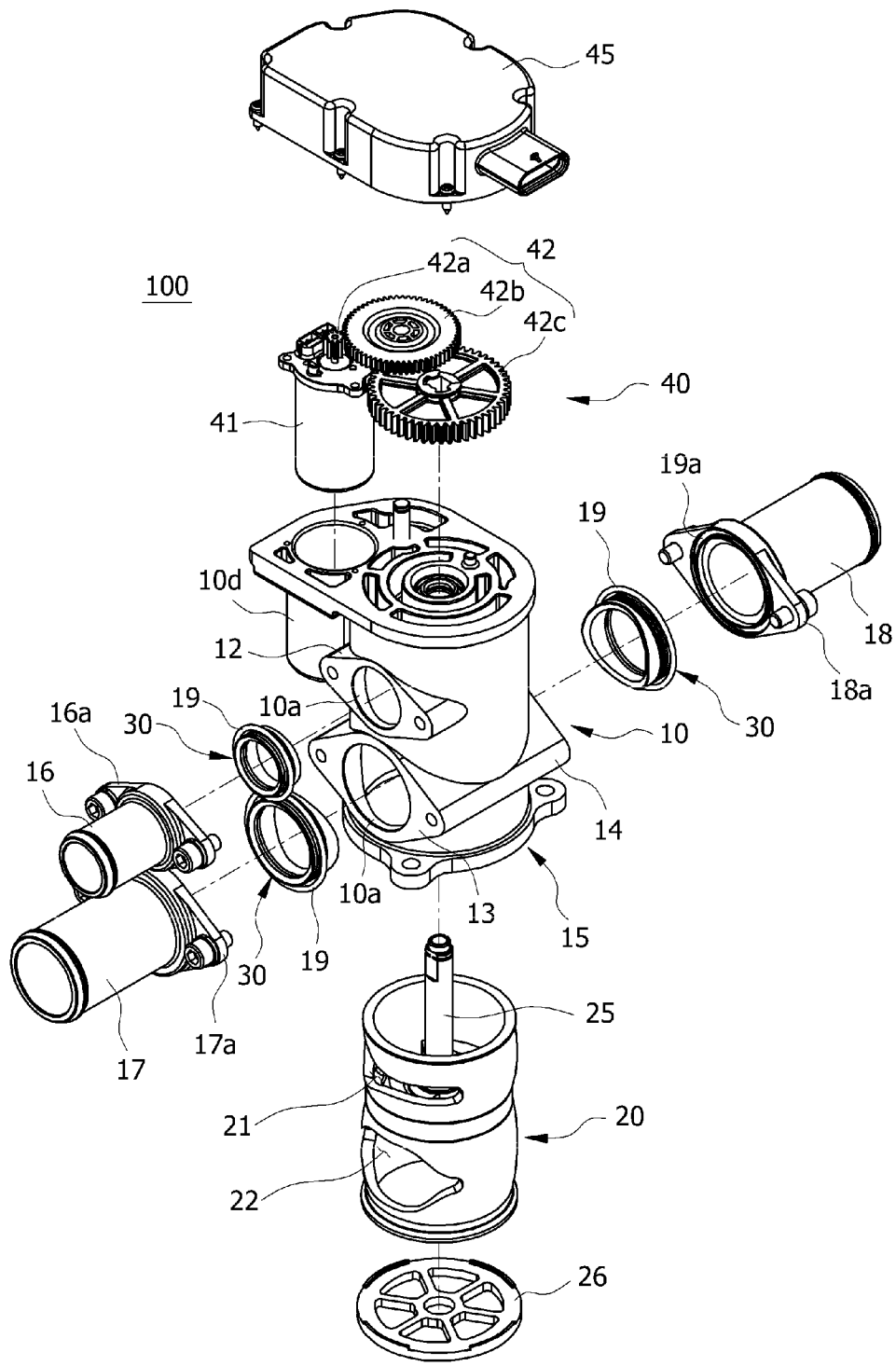
[Fig. 2]

[Fig. 3]
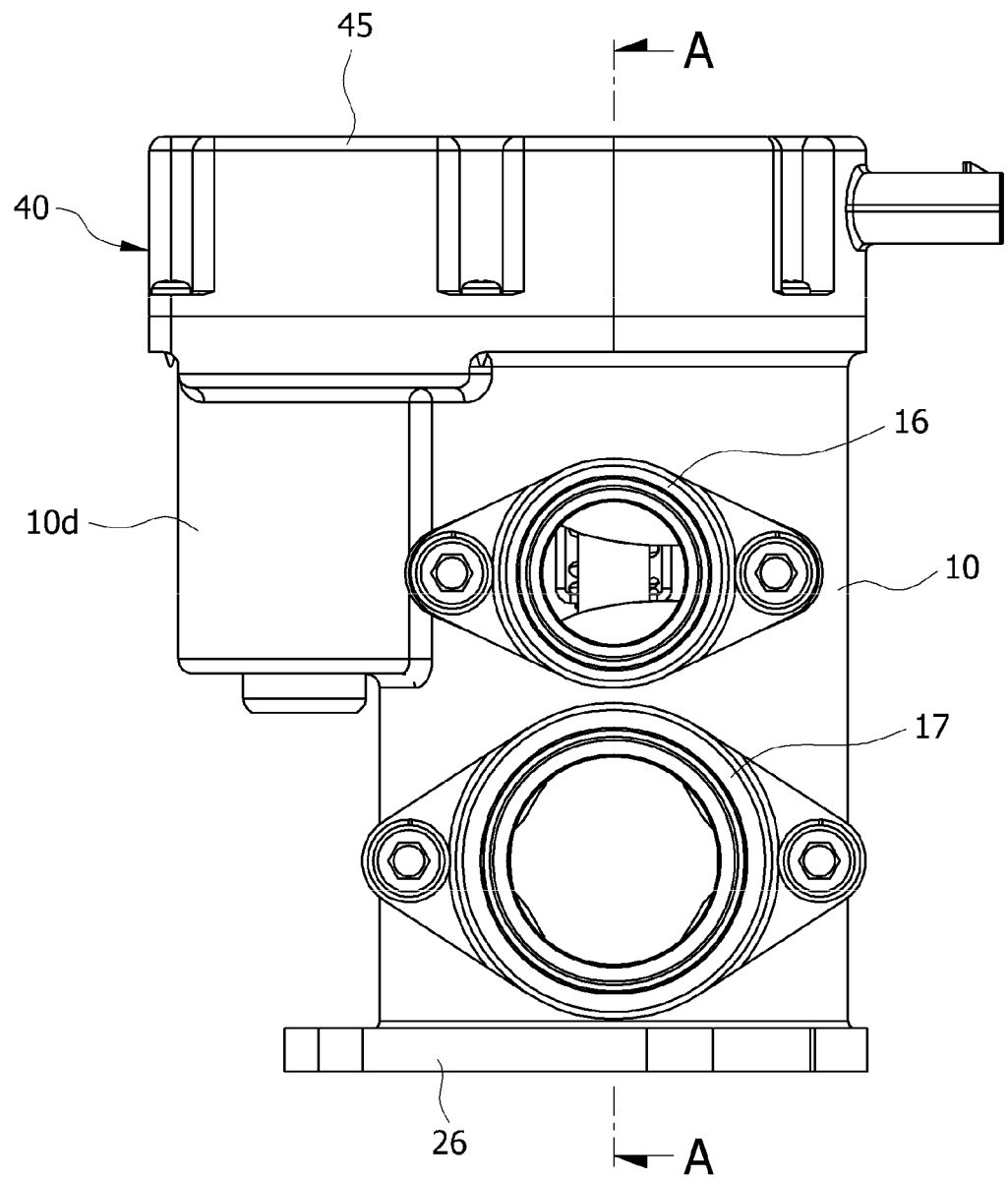

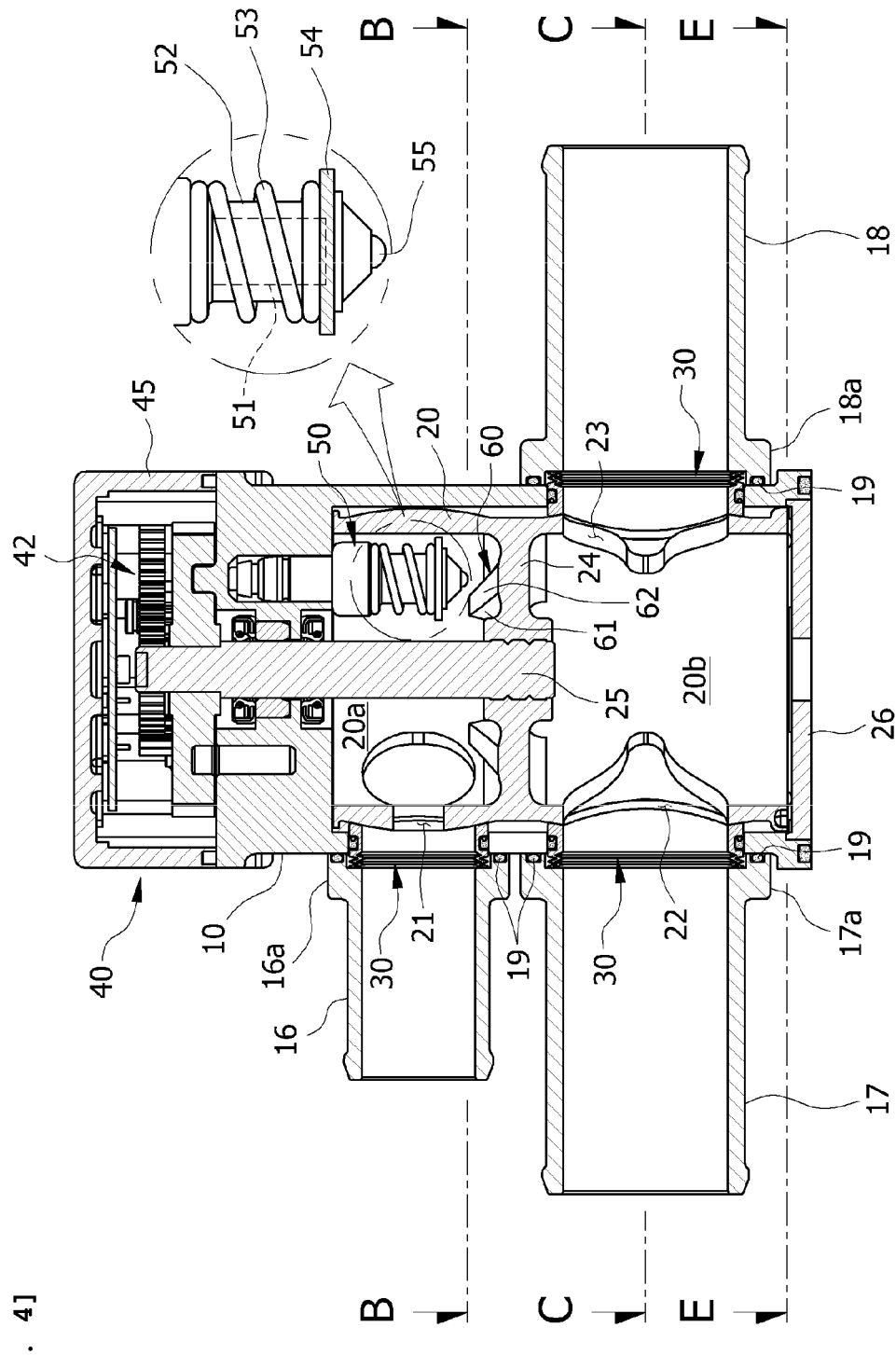
[Fig. 4]

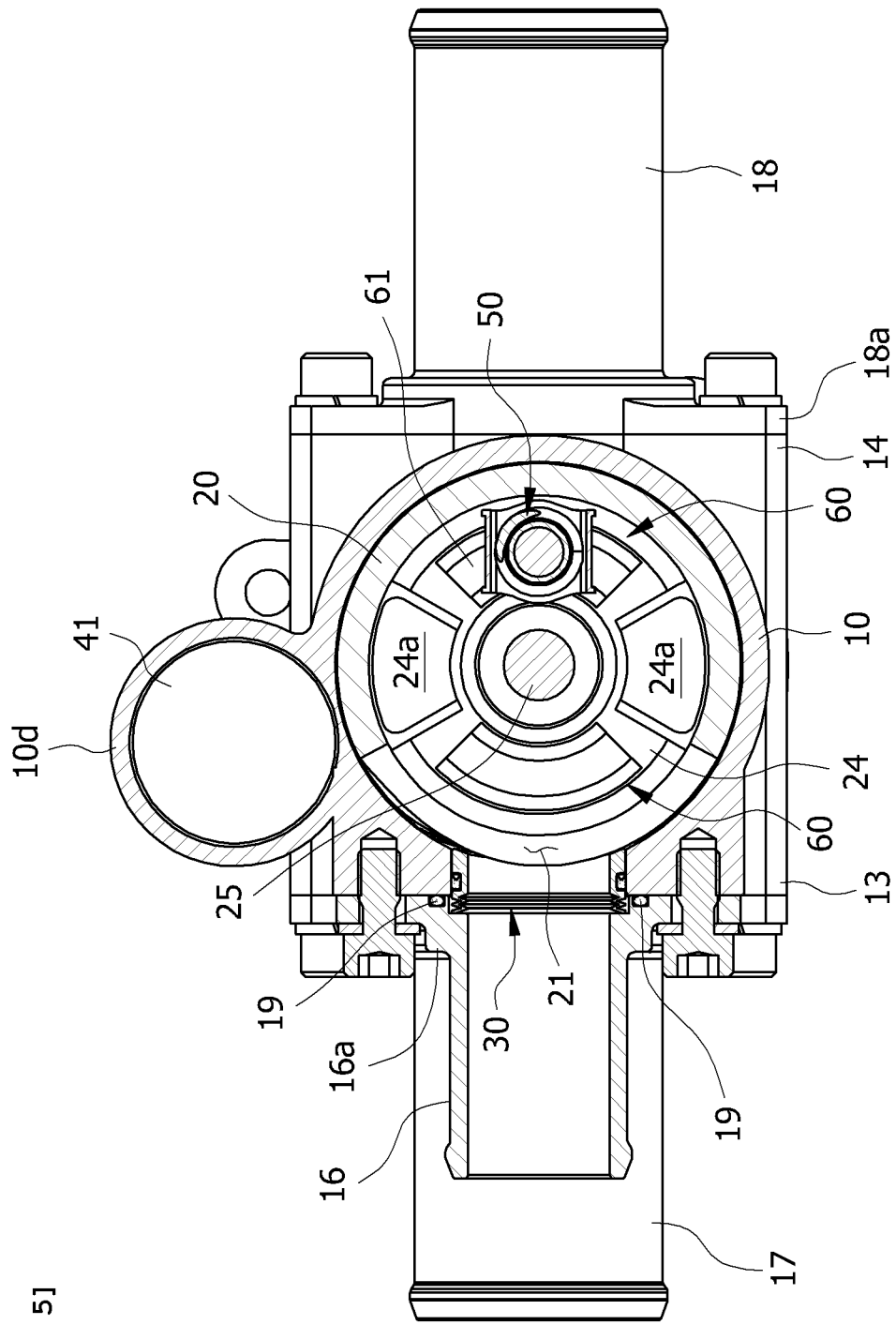
[Fig. 5]

[Fig. 6]
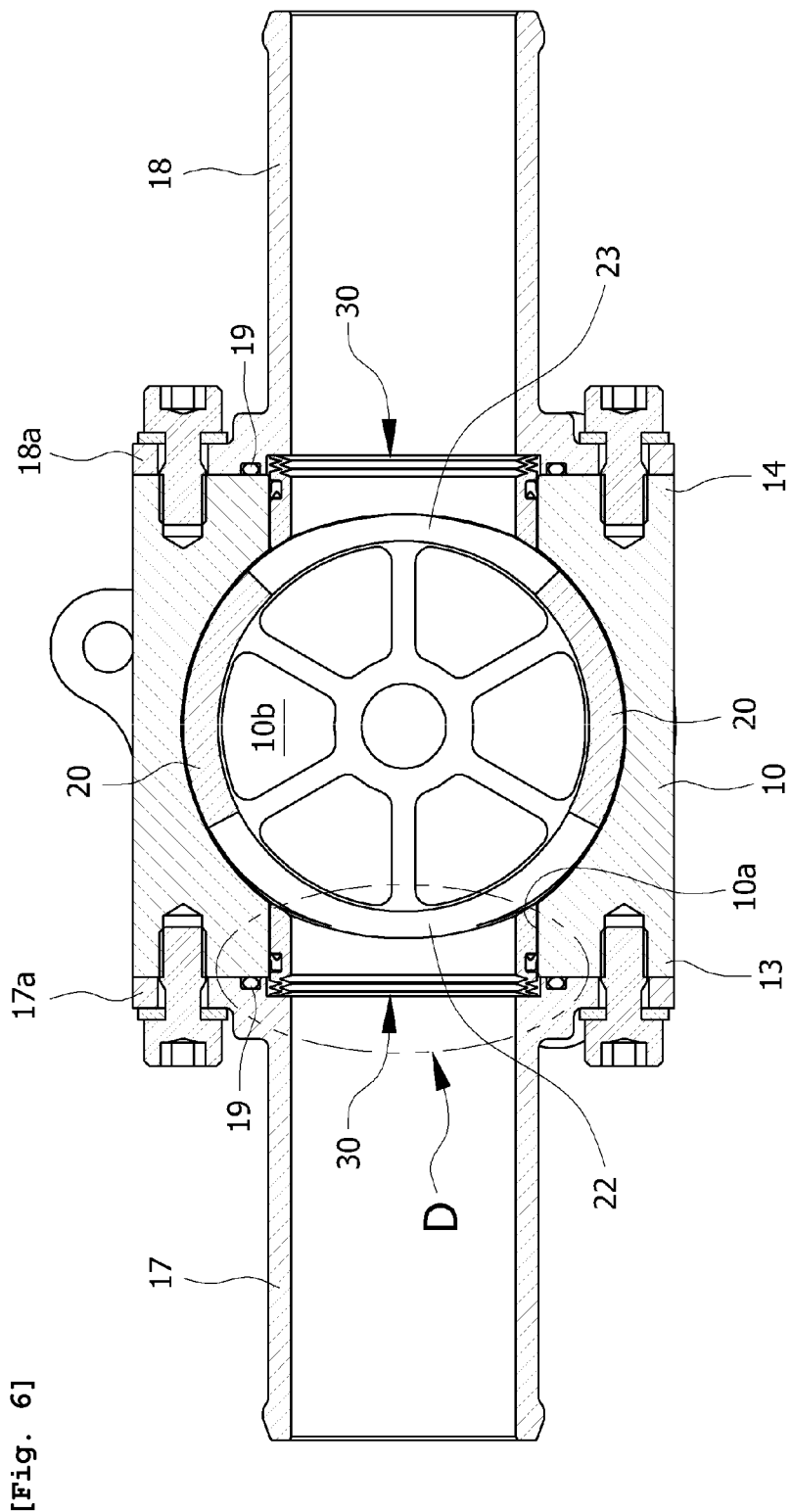

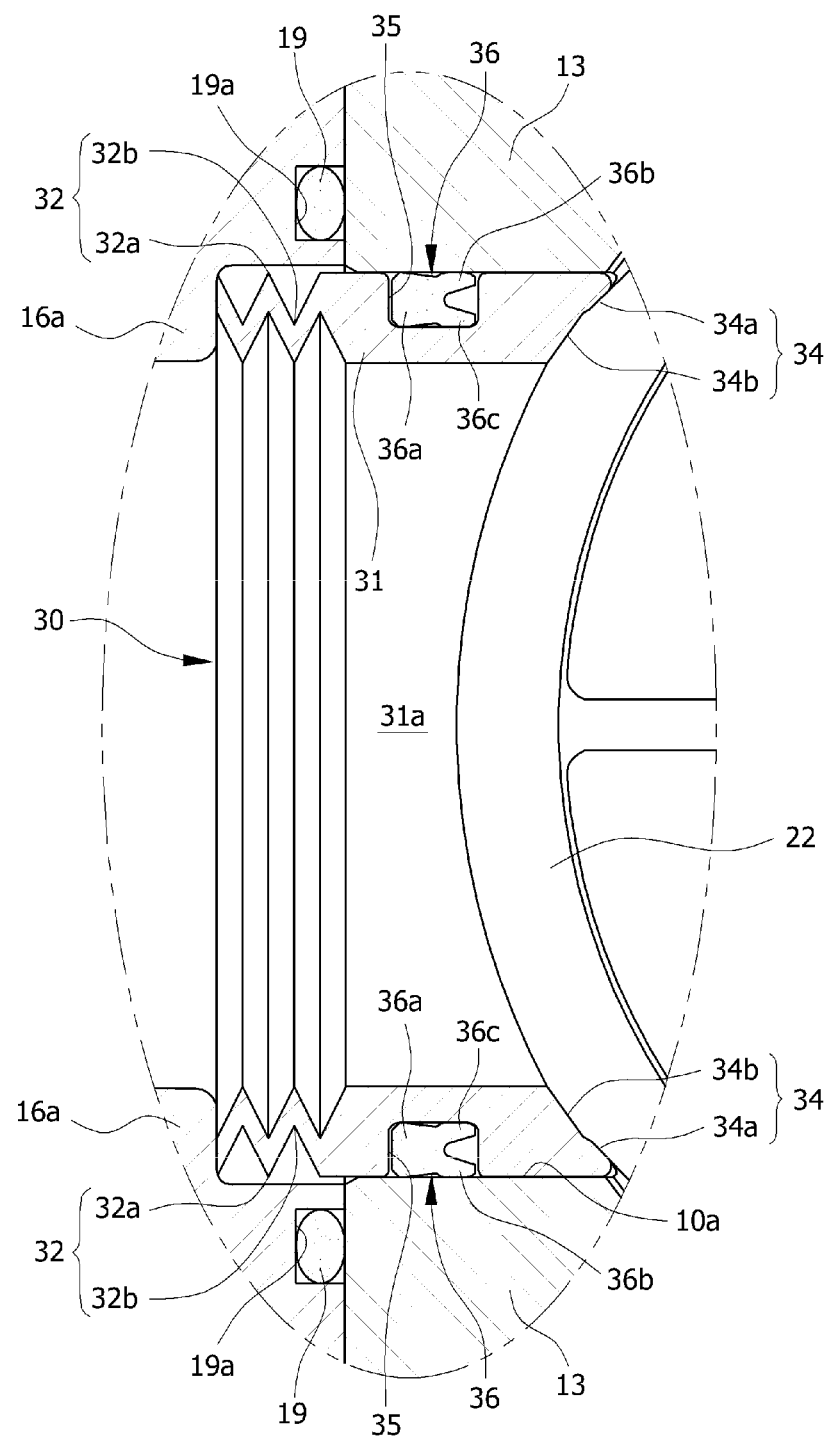
[Fig. 7]

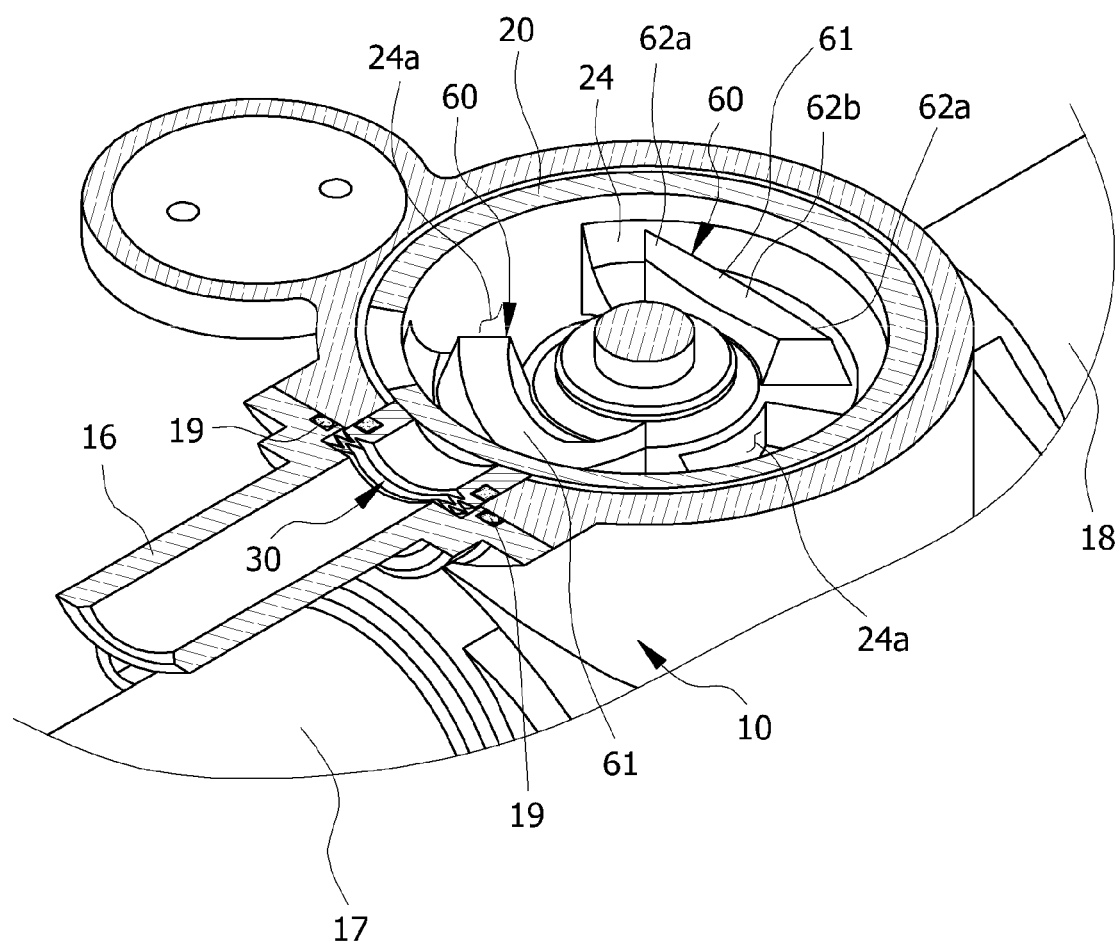
[Fig. 8]

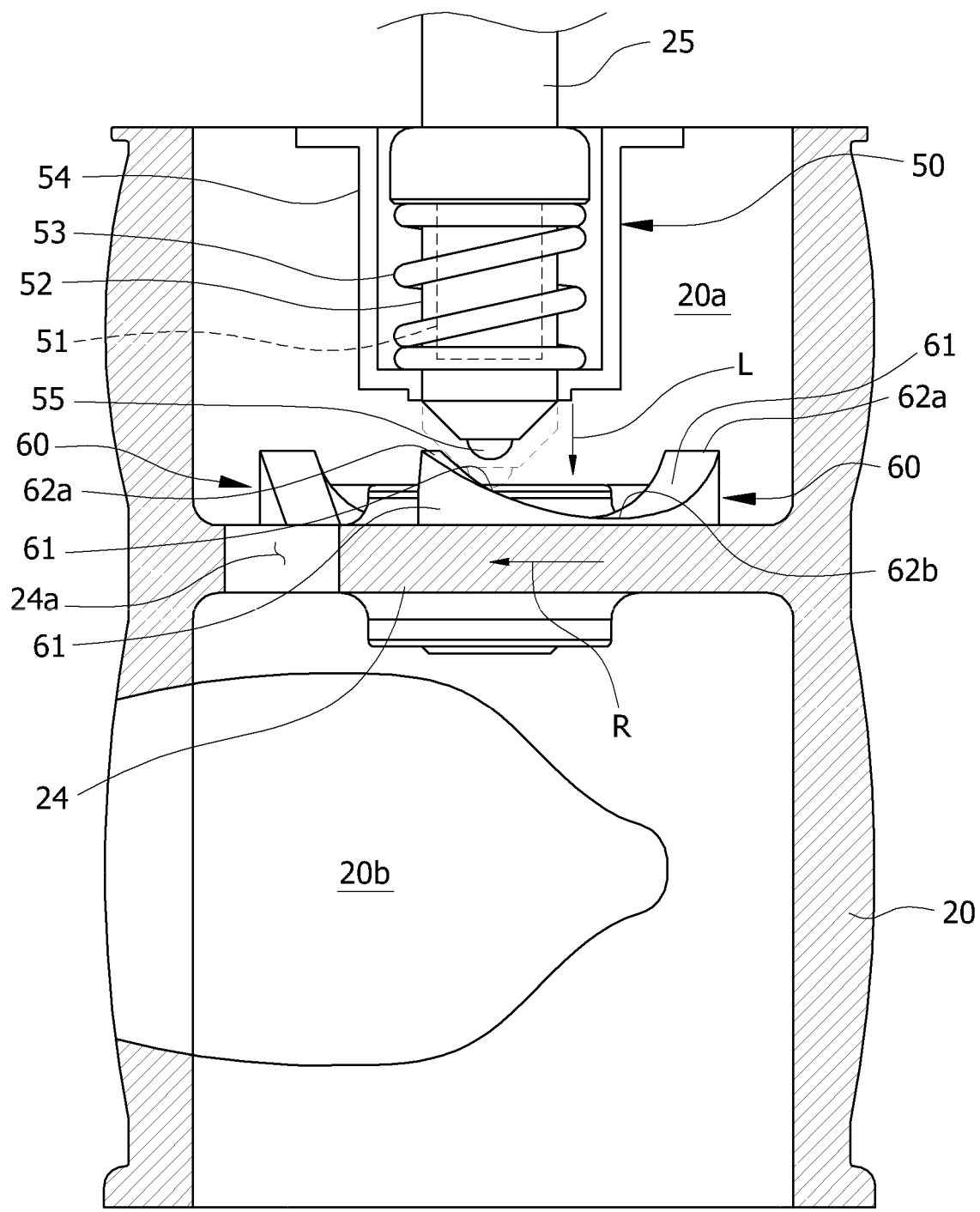
[Fig. 9]

[Fig. 10]
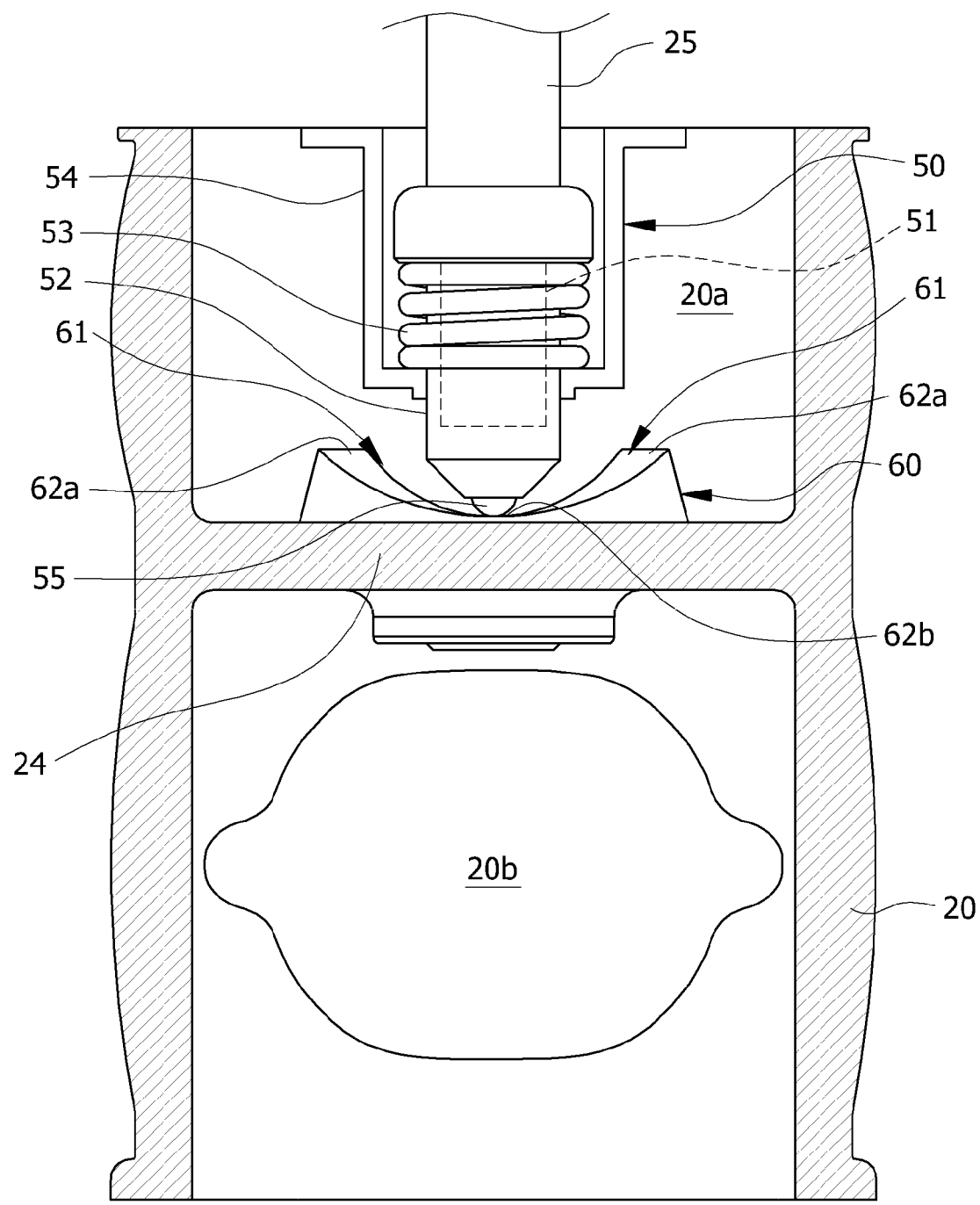

[Fig. 11]
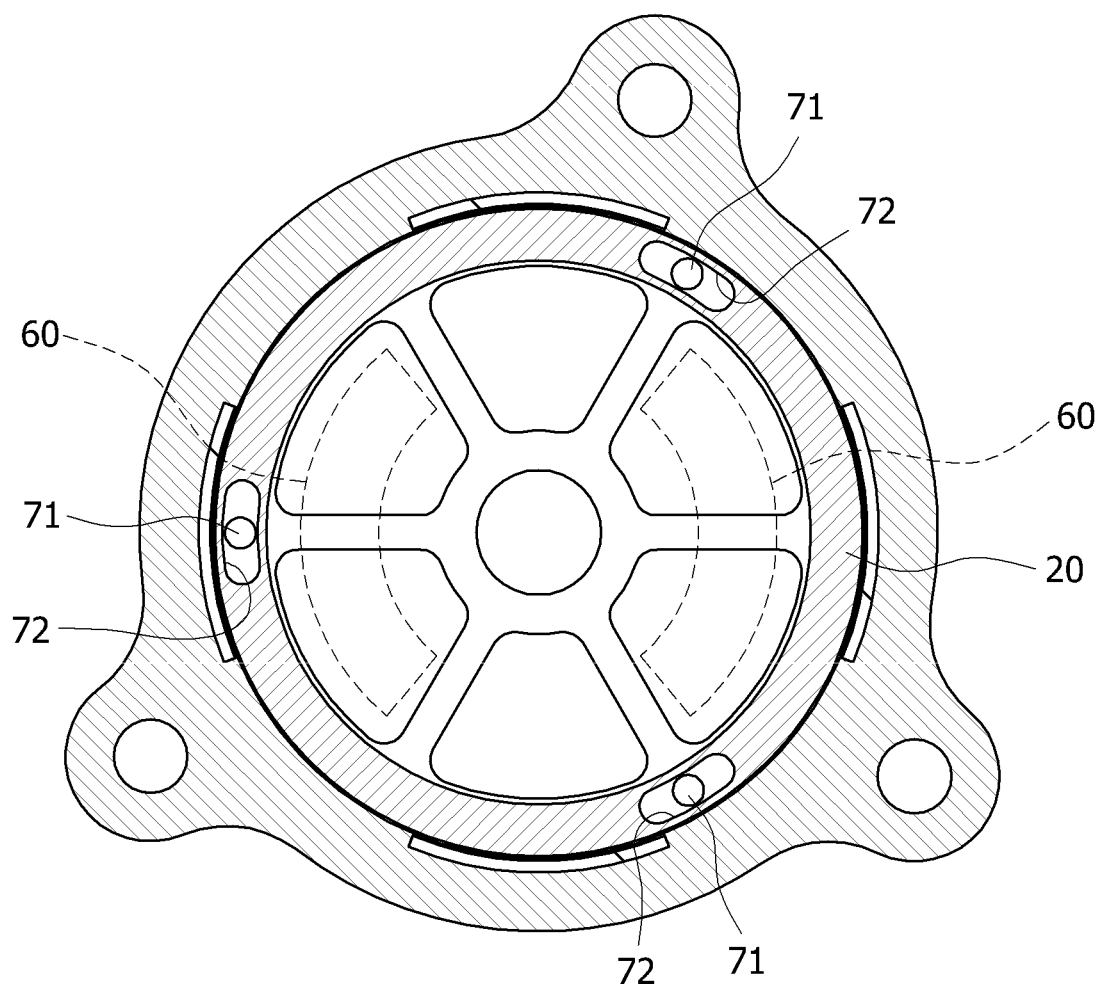

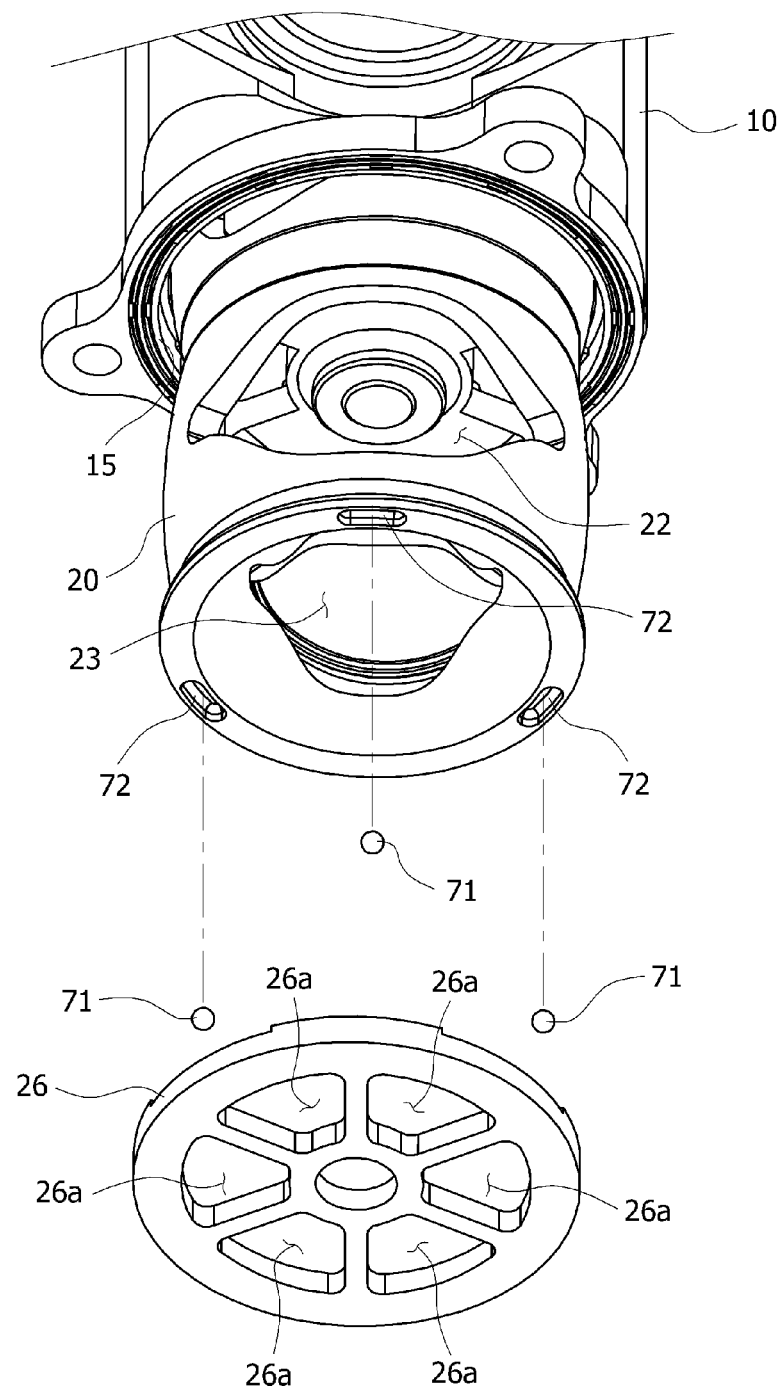
[Fig. 12]

[Fig. 13]
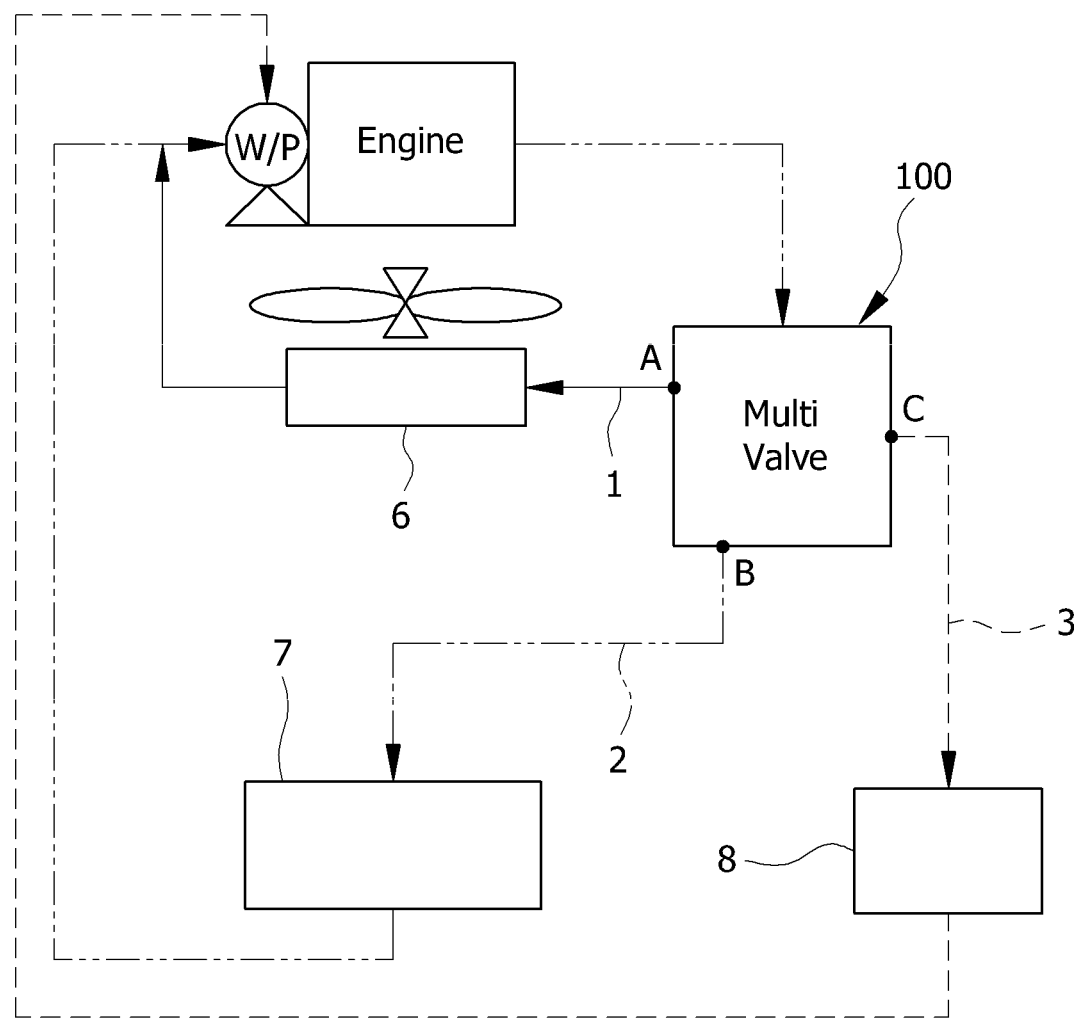

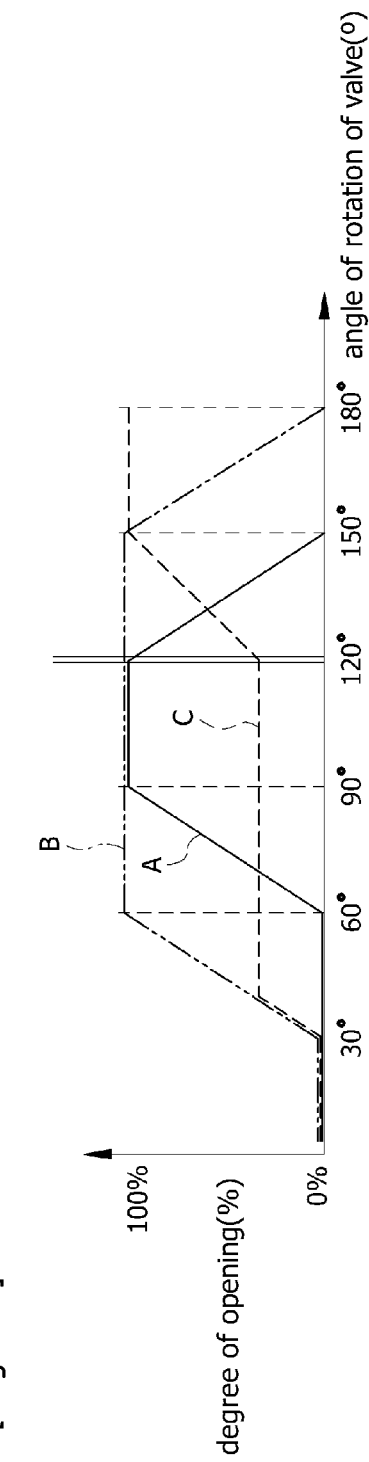
[Fig. 14]

FAIL SAFETY COOLANT CONTROL VALVE

CROSS REFERENCE TO RELATED APPLICATIONS

This application is a National Stage of International Application No. PCT/KR2014/009474 filed Oct. 8, 2014, claiming priority based on Korean Patent Application No. 10-2014-0097880 filed Jul. 31, 2014, the contents of all of which are incorporated herein by reference in their entirety.

TECHNICAL FIELD

The present invention generally relates to fail-safe coolant control valves for use in distribution of coolant drawn into valve housings. More particularly, the present invention relates to a fail-safe coolant control valve configured such that when an actuator malfunctions or the temperature of coolant abnormally increases, a valve member is rotated in a predetermined direction in response to an increase in temperature of the coolant, whereby a fail-safe function can be reliably conduced.

BACKGROUND ART

Valve devices for switching the flow direction of various kinds of coolants in several paths are generally used in different industrial fields.

Particularly, vehicles are provided with a variety of valve devices. Such valve devices are configured to distribute or control the flow of different kinds of coolants that are provided depending on the purposes, such as cooling a drive source (an internal combustion engine for a vehicle or a battery for an electric vehicle), air conditioning of a passenger compartment, exhaust gas recirculation (of an EGR system), etc.

For example, a coolant control valve for cooling a drive source (an engine or a battery) is configured to control the flow of coolant for optimizing the temperature of a transmission and enhancing the output and fuel efficiency of the engine.

The operation of the coolant control valve for controlling the flow of coolant is as follows. In a cold start, coolant discharged from an engine (a drive source) is re-supplied to the engine through a bypass line (bypassing a radiator) to warm the engine, whereby the engine can be rapidly heated to an appropriate temperature. When the engine is overheated, the coolant is supplied to the radiator through a cooling line. Coolant cooled by the radiator is drawn into the engine so as to prevent the engine from overheating. Furthermore, in the cold start, some of coolant discharged from the engine may be supplied to an oil cooler so as to heat transmission oil.

Such a valve device includes: a valve housing having at least one inlet port and at least one outlet port; a valve member rotatably provided in the valve housing; and an actuator provided to rotate the valve member. The actuator includes a drive motor, and a motor gear train connected the drive motor. The drive force of the drive motor is transmitted to a rotating shaft of the valve member by the motor gear train, whereby the valve member can be rotated. The inlet port and the outlet port of the valve housing can selectively communicate with each other depending on the rotation of the valve member.

Meanwhile, the valve device has a fail-safe function in which the valve member is returned to its original position by a return spring provided on the rotating shaft of the valve member when an error of a control circuit, a failure of the drive motor or damage to the motor gear train is caused.

However, the conventional valve device uses a large-capacity drive motor because a comparatively large amount of power is required to overcome the elastic force of the return spring. Therefore, the production cost of the valve device is increased. Moreover, it is difficult to reduce the sizes and weights of parts because the large-capacity drive motor is used.

DISCLOSURE

Technical Problem

Accordingly, the present invention has been made keeping in mind the above problems occurring in the prior art, and an object of the present invention is to provide a fail-safe coolant control valve configured such that when an actuator malfunctions or the temperature of coolant in a valve housing abnormally increases, a valve member is rotated in a predetermined direction in response to an increase in temperature of the coolant, whereby a fail-safe function can be reliably conduced.

Technical Solution

In order to accomplish the above object, the present invention provides a fail-safe coolant control valve, including: a valve housing provided on an outer surface thereof with at least two ports, the valve housing having therein an internal space communicating with the ports; a valve member rotatably installed in the internal space of the valve housing; an actuator rotating the valve member; and a fail-safe unit rotating the valve member depending on a temperature of a coolant in the valve housing when a failure occurs.

The fail-safe unit may include: a thermostat including a wax contracting or expanding depending on the temperature of coolant drawn into the internal space of the valve housing, and a temperature responding cylinder linearly moved upward or downward by the contraction or expansion of the wax; and a rotating conversion part integrally formed on a portion of the valve member, the rotating conversion part converting the upward or downward linear movement of the temperature responding cylinder into rotation of the valve member.

The rotating conversion part may have an inclined surface capable of making contact with a lower end of the temperature responding cylinder when the temperature responding cylinder is linearly moved by the expansion of the wax. The inclined surface may include a top dead point and a bottom dead point disposed below the top dead point. As the lower end of the temperature responding cylinder linearly moves along the inclined surface between the top dead point and the bottom dead point, the valve member is rotated.

The rotating conversion part may have a concave structure, in which two top dead points are symmetrically disposed at left and right sides of the bottom dead point so that two inclined surfaces are symmetrically formed at the left and right sides of the bottom dead point.

The rotating conversion part may have a convex structure, in which two bottom dead points are symmetrically disposed at left and right sides of the top dead point so that two inclined surfaces are symmetrically formed at the left and right sides of the top dead point.

A rolling member may be installed in the lower end of the temperature responding cylinder. The rolling member may come into rolling contact with the inclined surface of the rotating conversion part.

When viewed from a plan view, the rotating conversion part may extend an arc shape corresponding to a direction in which the valve member rotates.

A support may be installed below the valve housing. The support may support a lower end of the valve member and have at least one opening. A plurality of rotation support balls may be interposed between the lower end of the valve member and the support and arranged under the lower end of the valve member at positions spaced apart from each other at regular intervals. The rotation support balls may rotatably support the lower end of the valve member.

A plurality of receiving depressions may be formed in the lower end of the valve member so that the rotation support balls are received in the respective receiving depressions. Each of the receiving depressions may extend to have an arc shape in a circumferential direction of the valve member.

Advantageous Effects

In the present invention, when an actuator malfunctions or the temperature of coolant in a valve housing abnormally increases, a valve member is rotated in a predetermined direction in response to an increase in temperature of the coolant so that a fail-safe function in which an inlet port selectively communicates with at least one outlet port can be reliably conduced. Particularly, the present invention does not use a separate return spring unlike the conventional technique. Therefore, when the valve member is rotated, the force to overcome the elastic force of the return spring is not required. Thus, a small capacity drive motor can be used. The use of such a small capacity drive motor makes it possible to reduce the size and weight of parts.

Furthermore, when the actuator malfunctions or the temperature of the coolant abnormally increases, the temperature responding cylinder is linearly moved in the vertical direction in response to an increase in temperature of the coolant in the valve housing. As the temperature responding cylinder is linearly moved in the vertical direction, a rotating conversion part can smoothly rotate the valve member in a predetermined direction so that the inlet port can selectively communicate with at least one outlet port, thus making the flow of the coolant reliable.

In the present invention, when a wax expands in response to an increase in temperature of the coolant in the valve housing, the temperature responding cylinder linearly moves downward. Here, the lower end of the temperature responding cylinder moves along an inclined surface of the rotating conversion part. Thus, the rotation of the valve member can be more reliably and precisely conducted.

Furthermore, the rotating conversion part has a concave or convex structure having two inclined surfaces. Therefore, even if the operation of the valve member is interrupted at any position by malfunction of the actuator, the valve member can be reliably and precisely rotated by interaction with the temperature responding cylinder.

A rolling member provided in the lower end of the temperature responding cylinder comes into rolling contact with the inclined surface of the rotating conversion part. Therefore, the vertical linear movement of the temperature responding cylinder can be effectively and reliably converted into the rotation of the valve member.

When the lower end of the temperature responding cylinder moves downward along the inclined surface of the rotating conversion part, the rotating conversion part can more reliably and precisely guide the rotation of the valve member because the rotating conversion part has an arc shape corresponding to the direction in which the valve member rotates.

A plurality of rotation support balls uniformly supports the lower end of the valve member. Therefore, the valve member can be reliably rotated. In addition, the rotation support balls can reduce rolling resistance attributable to an asymmetric load of the valve member caused when the rotation of the valve member is induced by the thermostat and the rotating conversion part, thus reliably preventing deformation or damage to the valve member.

Furthermore, the rotation support balls disposed in the respective receiving depressions roll on the upper surface of the rotation support as the valve member rotates, thus reliably supporting the lower end of the valve member. Moreover, the rolling resistance attributable to the asymmetric load of the valve member can be further reduced.

DESCRIPTION OF DRAWINGS

FIG. 1 is a perspective view illustrating a fail-safe coolant control valve according to an embodiment of the present invention;

FIG. 2 is an exploded perspective view illustrating the fail-safe coolant control valve according to the embodiment of the present invention;

FIG. 3 is a front view showing the fail-safe coolant control valve according to the present invention;

FIG. 4 is a sectional view taken along line A-A of FIG. 3;

FIG. 5 is a sectional view taken along line B-B of FIG. 4;

FIG. 6 is a sectional view taken along line C-C of FIG. 4;

FIG. 7 is a view showing an enlargement of portion D designated by the arrow of FIG. 5;

FIG. 8 is a partial broken perspective view showing the cut-out upper portions of a valve housing and a valve member of the fail-safe coolant control valve so as to illustrate in detail a rotating conversion part according to the present invention;

FIG. 9 is a view showing the fail-safe coolant control valve before a thermostat expands according to the present invention;

FIG. 10 is a view showing the valve member rotated by expansion of the thermostat in the fail-safe coolant control valve according to the present invention;

FIG. 11 is a sectional view taken along line E-E of FIG. 4;

FIG. 12 is a view showing rotation support balls interposed between the valve member and a rotation support of the fail-safe coolant control valve according to the present invention;

FIG. 13 is a view showing an example of an engine cooling system using the fail-safe coolant control valve according to the present invention; and FIG. 14 is a graph showing a degree of opening of an outlet port as a function of a selective rotation angle of the valve member of the fail-safe coolant control valve according to the present invention.

BEST MODE

Hereinafter, an embodiment of the present invention will be described in detail with reference to the attached drawings. For reference, the size of each element, the thickness of lines illustrating the element, etc. may be exaggeratedly expressed in the drawings for the sake of understanding the present invention. The terms and words used for elements in the description of the present invention have been determined in consideration of the functions of the elements in the present invention. The terms and words may be changed depending on the intention or custom of users or operators, so that they must be defined based on the whole content of the specification of the present invention.

FIGS. 1 through 12 illustrate a fail-safe coolant control valve according to an embodiment of the present invention.

As shown in FIGS. 1 through 3, the fail-safe coolant control valve 100 according to the present invention includes: a valve housing 10 having two or more ports 10a and 15; a valve member 20 rotatably installed in the valve housing 10; a sealing unit installed in each port 10a, 15 of the valve housing 10; an actuator 40 rotating the valve member 20; and a fail-safe unit 50 and 60 that detect if coolant in the valve housing 10 has overheated and rotates the valve member 20 to open at least one port 10a by a predetermined degree.

As shown in FIG. 5, the valve housing 10 has in an outer surface thereof the two or more ports 15 and 10a. The ports 15 and 10a include an inlet port 15 through which coolant is drawn into the valve housing 10, and one or more outlet ports 10a through which coolant is discharged out of the valve housing 10. In FIGS. 1 and 2, although the inlet port 15 has been illustrated as being formed in a lower end of the valve housing 10 and three outlet ports 10a have been illustrated as being formed in a side surface of the valve housing 10, the present invention is not limited to this. That is, the number of ports, the positions thereof, etc. can be modified in a variety of ways.

The valve housing 10 has an internal space communicating with the ports 15 and 10a. As shown in FIG. 2, a plurality of flanges 12, 13, and 14 protrude from the outer surface of the valve housing 10. As shown in FIGS. 3 through 5, the outlet ports 10a are respectively formed in the flanges 12, 13, and 14. Flanges 16a, 17a, and 18a of port fittings 16, 17, and 18 are respectively coupled to the flanges 12, 13, and 14 of the valve housing 10. Each port fitting 16, 17, 18 has a pipe or tube shape and is selectively connected to a radiator, an oil cooler, or an indoor heater, etc.

The valve member 20 is rotatably installed in the internal space of the valve housing 10 by a valve shaft 25. An upper end of the valve shaft 25 passes through and protrudes upward from an upper surface of the valve housing 10. The actuator 40 is connected to the protruding upper end of the valve shaft 25 so that the valve member 20 can be rotted by the drive force of the actuator 40.

As shown in FIGS. 2 and 4, one or more openings 21, 22, and 23 are formed in an outer surface of the valve member 20. The valve member 20 has a cylindrical structure corresponding to an inner surface of the valve housing 10. The outer surface of the valve member 20 has a curved shape.

The valve shaft 25 is installed in a central portion of the valve member 20. As the valve member 20 is rotated by the valve shaft 25, each of the openings 21, 22, and 23 of the valve member 20 selectively communicates with the corresponding one of the outlet ports 10a so that each outlet port 10a of the valve housing 10 can be selectively opened or closed. Thereby, the inlet port 15 of the valve housing 10 can selectively communicate with at least one of the outlet ports 10a.

As shown in FIGS. 4 and 5, the valve member 20 includes in a medial portion thereof a partition 24 formed in a horizontal direction. The internal space of the valve member 20 is partitioned into two hollow spaces 20a and 20b by the partition 24. One or more openings 24a are formed in the partition 24. The two hollow spaces 20a and 20b communicate with each other through the openings 24a.

The sealing unit 30 may be installed in the outlet port 10a or the inlet port 15 of the valve housing 10. The sealability of the one or more outlet ports 10a or the inlet port 15 can be ensured by the sealing unit 30.

The sealing unit 30 includes a sealing body 31 airtightly installed on an inner surface of the outlet port 10a, and at least one elastic element 32 integrally provided on a first end of the sealing body 31.

The sealing body 31 has a cylindrical structure that has therein a hollow space 31a, through which coolant flows. An outer surface of the sealing body 31 having the cylindrical structure corresponds to the inner surface of the port 10a. Thereby, the outer surface of the sealing body 31 can come into airtight contact with the inner surface of the outlet port 10a.

In an embodiment, as shown in FIG. 7, the sealing body 31 has the at least one elastic element 32 integrally formed on the first end thereof, and a sealing surface 34 coming into airtight contact with the outer surface of the valve member 20.

The elastic element 32 is integrally provided on the first end of the sealing body 31 to form a single body with the sealing body 31. The elastic element 32 axially applies elastic force to the sealing body 31 so that the sealing surface 34 of the sealing body 31 can be reliably maintained in close contact with the outer surface of the valve member 20.

Particularly, the elastic element 32 is formed of a bellows pipe structure having one or more ridges 32a and one or more valleys 32b that are successively formed on the first end of the sealing body 31, thus applying elastic force and restoring force to the sealing body 31. In this way, the elastic element 32 can apply sufficient elastic force to the sealing body 31, whereby the sealability of the sealing body 31 can be further enhanced.

The elastic element 32 may be made of the same material as that of the sealing body 31, and the elastic element 32 and the sealing body 31 may be formed into a single body by injection molding. Alternatively, the elastic element 32 is made of highly-elastic material differing from the material of the sealing body 31, and they may be formed into a single body by double injection molding.

The sealing body 31 has on a second end thereof the annular sealing surface 34 that comes into close contact with the outer surface of the valve member 20. As shown in FIG. 7, the sealing surface 34 includes a first close contact surface 34a having a curved shape corresponding to the curved outer surface of the valve member 20, and a second close contact surface 34b that is formed in a stepped shape inside the first close contact surface 34a.

In an initial stage of an assembly process, only the first close contact surface 34a of the sealing surface 34 comes into contact with the outer surface of the valve member 20 so that an entire contact area of the sealing surface 34 is comparatively reduced, whereby abrasion of the sealing body 31 can be markedly reduced during a dynamic friction process. After a predetermined period of time has passed after the assembly process, the sealing surface 34 is flexibly changed in shape because of the stepped structure of the first close contact surface 34a and the second close contact surface 34b of the sealing surface 34. Thereby, both the first close contact surface 34a and the second close contact surface 34b of the sealing surface 34 can come into closer contact with the outer surface of the valve member 20. Consequently, the sealability on the sealing surface 34 can be markedly enhanced.

The sealing body 31 is made of material such as polytetrafluoroethylene (PTFE) having a comparatively low friction coefficient and superior chemical resistance. As such, because the sealing body 31 is made of material having a low friction coefficient, a dynamic friction load between the outer surface of the valve member 20 and the sealing body 31 can be reduced when the valve member 20 rotates relative to the sealing body 31 while making contact with the sealing body 31. Hence, abrasion of the sealing body 31 can be markedly reduced.

An annular groove 35 is formed in the outer surface of the sealing body 31, and a lip seal 36 is installed in the annular groove 35. The lip seal 36 includes an annular seal body 36a that is fitted into the annular groove 35 and is brought into close contact with the inner surface of the annular groove 35, and first and second lip parts 36b and 36c that extend outward from the annular seal body 36a so as to be capable of being changed in shape.

The lip seal 36 is made of material such as ethylene propylene diene monomer (EPDM) that can be elastically changed in shape so as to further enhance the sealability of the sealing unit.

By virtue of the above-mentioned structure of the lip seal 36, when the annular seal body 36a is inserted into the annular groove 35, the first lip part 36b elastically changes in shape in such a way that the end thereof comes into airtight contact with the inner surface of the outlet port 10a.

Furthermore, when the annular seal body 36a is inserted into the annular groove 35, the second lip part 36c is elastically changed in shape by the bottom of the annular groove 35 so that the annular seal body 36a can be elastically biased toward the outer diameter of the annular groove 35. Thereby, the end of the first lip part 36b can more airtightly make contact with the inner surface of the outlet port 10a.

As shown in FIGS. 3 through 5, a receiving groove 19a in which a sealing ring 19 is installed is formed in each of the flanges 15a, 17a, and 18a of the port fittings 16, 17, and 18. The sealing ring 19 is disposed around the outer circumferential surface of the sealing unit 30, thus further enhancing the sealability of the sealing unit 30.

The actuator 40 is installed on the upper end of the valve housing 10 and configured to rotate the valve member 20.

The actuator 40 includes a drive motor 41, and a motor gear train 42 provided to transmit the drive force of the drive motor 41.

The drive motor 41 is stably installed at a predetermined position in the valve housing 10. As shown in FIGS. 1 and 2, a motor receiving part 10d is integrally formed with the valve housing 10. The drive motor 41 is stably installed in the motor receiving part 10d.

The motor gear train 42 includes a drive gear 42a installed on an output shaft of the drive motor 41, and two or more driven gears 42b and 42c engaging with the drive gear 42a. A rotating shaft 25 of the valve member 20 is coupled to the final driven gear 42c. The drive force of the drive motor 41 is transmitted to the rotating shaft 25 of the valve member 20 at a gear ratio of the motor gear train 42.

A cover 45 is installed above the drive motor 41 and the motor gear train 42 so as to protect the drive motor 41 and the motor gear train 42. The cover 45 is fastened to the upper surface of the valve housing 10 by a plurality of fasteners.

If a failure of the actuator 40 such as a failure of a control circuit or the drive motor 41, damage of the motor gear train 42, etc. is caused or the temperature of coolant in the valve housing 10 is abnormally increased, the fail-safe unit 50 and 60 detects that the temperature of the coolant has been overheated and then rotates the valve member 20. Then, at least one of the outlet ports 10a is opened so that the inlet port 15 can selectively communicate with the at least one outlet port 10a.

In an embodiment, as shown in FIG. 4, the fail-safe unit 50 and 60 includes: a thermostat 50 having a temperature responding cylinder 52 that senses the temperature of coolant drawn into the internal space of the valve housing 10 and linearly moves in the vertical direction depending on the sensed temperature of coolant; and a rotating conversion part 60 that converts the vertical linear movement of the temperature responding cylinder 52 of the thermostat 50 into rotation of the valve member 20.

As shown in FIG. 4, the thermostat 50 includes: a wax 51 contracting or expanding depending on the temperature of coolant drawn into the internal space of the valve housing 10; the temperature responding cylinder 52 that is linearly moved in the vertical direction by the contraction or expansion of the wax 51; and an elastic spring 53 elastically supporting the temperature responding cylinder 52.

Particularly, the temperature responding cylinder 52 is installed in the upper portion of the valve housing 10 so as to be capable of linearly moving in the vertical direction. Contracting or expanding depending on the temperature of coolant, the wax 51 is housed in the temperature responding cylinder 52. The temperature responding cylinder 52 is linearly moved in the vertical direction by contraction and expansion of the wax 51. The elastic spring 53 is provided around the outer circumferential surface of the temperature responding cylinder 52 so as to elastically support the vertical linear movement of the temperature responding cylinder 52. The spring 53 is installed such that it is supported by a bracket 54 in the valve housing 10.

The operation of the thermostat 50 will be explained in detail. As the temperature of the coolant in the valve housing 10 increases, the wax 51 expands in response to an increase in temperature of the coolant. The temperature responding cylinder 52 is linearly moved downward by the expansion of the wax 51. Here, the temperature responding cylinder 52 linearly moves downward while overcoming the elastic force of the spring 53. Contrary to this, the wax 51 contracts in response as the temperature of the coolant in the valve housing 10 decreases. The temperature responding cylinder 52 is linearly moved upward by the contraction of the wax 51. The upward linear movement of the temperature responding cylinder 52 can be more reliably implemented by the elastic force of the elastic spring 53.

The rotating conversion part 60 integrally protrudes from a portion of the valve member 20. The rotating conversion part 60 is disposed at a position at which it can easily make contact with a lower end of the temperature responding cylinder 52 while corresponding to the vertical linear movement of the temperature responding cylinder 52.

As shown in FIGS. 4, 9 and 10, the rotating conversion part 60 may be integrally formed with an upper surface of the partition 24 of the valve member 20 or, alternatively, assembled with the partition 24 after being manufactured separately therefrom. The rotating conversion part 60 is disposed facing the lower end of the temperature responding cylinder 52 of the thermostat 50.

The rotating conversion part 60 includes an inclined surface 61 making contact with the lower end of the temperature responding cylinder 52 that is linearly moved downward by expansion of the wax 51. The inclined surface 61 has one or more top dead points 62a and a bottom dead point 62b that is located at a position lower than the top dead points 62a.

When the wax 51 expands in response to an increase in temperature of the coolant in the valve housing 10 and the temperature responding cylinder 52 is thus linearly moved downward, the lower end of the temperature responding cylinder 62 begins to make contact with either of the top dead points 62a of the inclined surface 61 of the rotating conversion part 60 or with a portion of the inclined surface 61 adjacent to the top dead point 62a, as shown in FIG. 9. Subsequently, as the temperature responding cylinder 52 is further moved downward linearly (refer to the direction designated by arrow L of FIG. 9), the lower end of the temperature responding cylinder 52 pushes the inclined surface 61 of the rotating conversion part 60. Such downward linear movement of the temperature responding cylinder 52 continues until the lower end of the temperature responding cylinder 52 reaches the bottom dead point 62b of the inclined surface 61 of the rotating conversion part 60, as shown in FIG. 10. The rotating conversion part 60 and the valve member 20 are rotated in the direction designated by arrow R of FIG. 9 by the downward linear movement of the temperature responding cylinder 52 until entering the state of FIG. 10. When the valve member 20 becomes the state of FIG. 10 by the above-mentioned interaction between the temperature responding cylinder 52 and the rotating conversion part 60, at least one of the outlet ports 10a communicates the corresponding opening 21, 22, 23 of the valve member 20 and thus opens by a predetermined degree. As such, when at least one of the outlet ports 10a opens, the inlet port 15 can selectively communicate with at least one of the outlet ports 10a. For example, when all of the outlet ports 10a open, the inlet port 15 can communicate with all of the outlet ports 10a. When any one of the outlet ports 10a, particularly, only the outlet port adjacent the radiator, opens by a predetermined degree or more, the inlet port 15 can communicate with only the outlet port adjacent to the radiator.

Thereafter, when the temperature of the coolant in the valve housing 10 decreases, the wax 51 contracts in response. Then, the temperature responding cylinder 52 is linearly moved upward by the contraction of the wax 51 to a position higher than the top dead point of the rotating conversion part 60, thus entering the state of FIG. 9.

As such, as the temperature responding cylinder 52 linearly moves upward or downward between the top dead point 62a and the bottom dead point 62b, the rotation of the valve member 20 by means of the rotating conversion part 60 can be reliably guided, whereby the fail safe function can be effectively conducted.

As described above, the fail-safe unit 50 and 60 according to the present invention is configured such that when the temperature of coolant in the valve housing 10 increases, the wax 51 of the thermostat 50 expands in response so that the temperature responding cylinder 62 is linearly moved downward. While the temperature responding cylinder 62 is linearly moved downward, the lower end of the temperature responding cylinder 52 comes into contact with the inclined surface 61 of the rotating conversion part 60. Therefore, the rotating conversion part 60 can reliably guide the rotation of the valve member 20.

In an embodiment, as shown in FIGS. 8 through 10, the rotating conversion part 60 may have a concave structure, in which the bottom dead point 62b is disposed in the medial portion of the inclined surface 61 and the two top dead points 62a are symmetrically disposed at the left and right sides of the bottom dead point 62b so that the two inclined surfaces 61 are symmetrically formed at the left and right sides of the bottom dead point 62b.

In an alternative embodiment, the rotating conversion part 60 may have a convex structure, in which the top dead point 62a is disposed in the medial portion of the inclined surface 61 and the two bottom dead points 62b are symmetrically disposed at the left and right sides of the top dead point 62a so that the two inclined surfaces 61 are symmetrically formed at the left and right sides of the top dead point 62a.

As such, the rotating conversion part 60 has a concave or convex structure having the two symmetrical inclined surfaces 61. Thus, even if the operation of the valve member 20 is interrupted at only position because of a failure of the actuator 40, the rotation of the valve member 20 can be smoothly guided.

Furthermore, coming into rolling contact with the inclined surface 61 of the rotating conversion part 60, a ball-shaped rolling member 53 is installed in a lower end of the temperature responding cylinder 52. As the rolling member 53 comes into rolling contact with the inclined surface 61 of the rotating conversion part 60, the linear downward movement of the temperature responding cylinder 52 can be reliably and precisely converted into the rotating movement of the rotating conversion part 60.

As shown in FIG. 5, when viewed from the plan view, the rotating conversion part 60 extends in an arc shape corresponding to the direction (circumferential direction) in which the valve member 20 rotates. By virtue of the arc-shaped rotating conversion part 60, when the lower end of the temperature responding cylinder 52 moves along the inclined surface 61 of the rotating conversion part 60, the valve member 20 can be more precisely and reliably rotated by the rotating conversion part 60.

Furthermore, as shown in FIG. 5, two rotating conversion parts 60 may be symmetrically provided on the partition 24 of the valve member 20. In this case, the position of the thermostat 50 can be set in various ways.

As shown in FIGS. 11 and 12, a support 26 is installed on the lower end of the valve housing 10, that is, on the inlet port 15 of the valve housing 10. The support 26 is configured to support the lower end of the valve member 20.

The support 26 has one or more openings 26a. Coolant can be drawn into the valve housing 10 and the hollow spaces 20a and 20b of the valve member 20 through the openings 26a.

In addition, a plurality of rotation support balls 71 are interposed between the lower end of the valve member 20 and the support 26. The rotation support balls 71 can uniformly support the lower end of the valve member 20.

The rotation support balls 71 are arranged at positions spaced apart from each other at regular intervals so as to uniformly support the lower end of the valve member 20.

As such, because the rotation support balls 71 uniformly and rotatably support the lower end of the valve member 20, the valve member 20 can be smoothly rotated. Moreover, the rotation support balls 71 can reduce rolling resistance attributable to an asymmetric load of the valve member 20 generated when the valve member 20 rotates, thus reliably preventing deformation or damage to the valve member 20.

Furthermore, a plurality of receiving grooves 72, in which the respective rotation support balls 71 are provided, is formed in the lower end of the valve member 20. Each receiving depression 72 extends in the circumferential direction of the valve member 20 to have an arc shape. The rotation support balls 71 that are received in the respective receiving depressions 72 can reliably and smoothly support the rotation of the valve member 20 while rolling on the upper surface of the support 26 as the valve member 20 rotates. In addition, the rotation support balls 71 can further reduce the rolling resistance attributable to the asymmetric load of the valve member 20.

As described above, the present invention is configured such that when the temperature of the coolant abnormally increases or the actuator 40 malfunctions, the thermostat 50 senses the temperature of the coolant and converts using the rotating conversion part 60 the vertical linear movement of the temperature responding cylinder 52 into the rotation of the valve member 20 so that the valve member 20 is reliably rotated in a predetermined direction (in a direction in which at least one of the outlet ports 10*a* opens). Thereby, the fail-safe function can be effectively conducted.

Particularly, the present invention does not use a separate return spring unlike the conventional technique. Therefore, when the rotation of the valve member 20 is induced, the force to overcome the elastic force of the return spring is not required. Thus, a small capacity drive motor can be used. The use of such a small capacity drive motor makes it possible to reduce the size and weight of parts.

FIG. 13 is a view showing an example of an engine cooling system of an engine using the fail-safe coolant control valve 100 according to the present invention.

As shown in FIG. 13, the outlet ports 10*a* of the valve housing 10 includes a first outlet port A, a second outlet port B and a third outlet port C.

A first output line 1 coupled to the radiator 6 is connected to the first outlet port A. A second output line 2 coupled to an oil cooler 7 is connected to the second outlet port B. A third output line 3 coupled to an indoor heater 8 is connected to the third outlet port C.

As shown in FIG. 14, the degrees (%) of opening of the first, second, and third outlet ports A, B, and C of the valve housing 10 are varied depending on the angle (°) of rotation of the valve member 20. As such, it can be understood that the degrees (%) of opening of the outlet ports A, B, and C depending on the angle of rotation of the valve member 20 can be designed in various ways.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A fail-safe coolant control valve, comprising:
   a valve housing provided on an outer surface thereof with at least two ports, the valve housing having therein an internal space communicating with the ports;
   a valve member rotatably installed in the internal space of the valve housing;
   an actuator rotating the valve member; and
   a fail-safe unit rotating the valve member depending on a temperature of a coolant in the valve housing when a failure occurs,
   wherein the fail-safe unit comprises:
   a thermostat including wax contracting or expanding depending on the temperature of coolant drawn into the internal space of the valve housing, and a temperature responding cylinder linearly moved upward or downward by the contraction or expansion of the wax; and
   a rotating conversion part integrally formed on a portion of the valve member, the rotating conversion part converting the upward or downward linear movement of the temperature responding cylinder into rotation of the valve member,
   wherein the rotating conversion part has a first inclined surface capable of making contact with a lower end of the temperature responding cylinder when the temperature responding cylinder is linearly moved by the expansion of the wax, the first inclined surface including a first top dead point and a first bottom dead point disposed below the first top dead point, and, as the lower end of the temperature responding cylinder linearly moves along the first inclined surface between the first top dead point and the first bottom dead point, the valve member is rotated,
   wherein the valve member includes a partition formed in a horizontal direction intersecting a longitudinal direction of a valve shaft provided in a medial portion of the valve member, an internal space of the valve member being partitioned into a first hollow space and a second hollow space by the partition,
   wherein the rotating conversion part is provided on an upper surface of the partition, and
   wherein the thermostat is provided in the first hollow space, the first hollow space disposed above the second hollow space in a direction parallel with the valve shaft.

2. The fail-safe coolant control valve of claim 1, wherein the rotating conversion part has a concave structure, in which the first top dead point is disposed at the left side of the first bottom dead point, and a second top dead point is disposed at the right side of the first bottom dead point, such that the first top dead point and the second top dead point are symmetrically disposed, and the first inclined surface is formed at the left side of the first bottom dead point, and a second inclined surface is formed at the right side of the first bottom dead point, such that the first inclined surface and the second inclined surface are symmetrically formed.

3. The fail-safe coolant control valve of claim 1, wherein the rotating conversion part has a convex structure, in which the first bottom dead point is disposed at the left side of the first top dead point, and a second bottom dead point is disposed at the right side of the first top dead point, such that the first bottom dead point and the second bottom dead point are symmetrically disposed, and the first inclined surface is formed at the left side of the first top dead point, and a second inclined surface is formed at the right side of the first top dead point, such that the first inclined surface and the second inclined surface are symmetrically formed.

4. The fail-safe coolant control valve of claim 1, wherein a rolling member is installed in the lower end of the temperature responding cylinder, the rolling member coming into rolling contact with the first inclined surface of the rotating conversion part.

5. The fail-safe coolant control valve of claim 1, wherein when viewed from a plan view, the rotating conversion part extends an arc shape corresponding to a direction in which the valve member rotates.

6. The fail-safe coolant control valve of claim 1, wherein a support is installed below the valve housing, the support supporting a lower end of the valve member and having at least one opening, and
   a plurality of rotation support balls are interposed between the lower end of the valve member and the support and arranged under the lower end of the valve member at positions spaced apart from each other at regular intervals, the rotation support balls rotatably supporting the lower end of the valve member.

7. The fail-safe coolant control valve of claim 6, wherein a plurality of receiving depressions are formed in the lower end of the valve member so that the rotation support balls are received in the respective receiving depressions, each of the receiving depressions extending to have an arc shape in a circumferential direction of the valve member.

\* \* \* \* \*